(12) United States Patent
Todter (10) Patent No.: US 12,466,529 B2
(45) Date of Patent: Nov. 11, 2025

(54) APPARATUS AND METHOD FOR DEPTH CONTROL OF SUBMERSIBLE VESSELS

(71) Applicant: SubSeaSail LLC, San Diego, CA (US)

(72) Inventor: Chris Todter, San Diego, CA (US)

(73) Assignee: SubSeaSail, Inc., San Diego, CA (US)

( * ) Notice: Subject to any disclaimer, the term of this patent is extended or adjusted under 35 U.S.C. 154(b) by 662 days.

(21) Appl. No.: 17/849,652

(22) Filed: Jun. 26, 2022

(65) Prior Publication Data
US 2023/0415870 A1   Dec. 28, 2023

(51) Int. Cl.
*B63G 8/22* (2006.01)
*B63G 8/00* (2006.01)
*B63G 8/16* (2006.01)
*B63G 8/39* (2006.01)

(52) U.S. Cl.
CPC ............. *B63G 8/22* (2013.01); *B63G 8/001* (2013.01); *B63G 8/16* (2013.01); *B63G 8/39* (2013.01)

(58) Field of Classification Search
CPC . B63G 8/22; B63G 8/001; B63G 8/16; B63G 8/39; B63G 8/14; B63G 8/24
See application file for complete search history.

(56) References Cited

U.S. PATENT DOCUMENTS

| | | | | |
|---|---|---|---|---|
| 5,129,348 A * | 7/1992 | Rannenberg | ............. | B63G 8/24 114/333 |
| 5,704,309 A * | 1/1998 | Kohnen | ................... | B63G 8/16 114/123 |
| 8,220,408 B2 * | 7/2012 | Stone | ..................... | G01S 15/93 114/330 |
| 9,896,159 B1 * | 2/2018 | Stackpole | ............... | B63B 22/00 |
| 10,322,783 B2 * | 6/2019 | Valsvik | .................... | B63G 8/08 |
| 11,255,998 B2 * | 2/2022 | Postic | .................... | B63G 8/001 |
| 2016/0272291 A1 * | 9/2016 | Outa, | ........................ | G05D 1/10 |
| 2018/0222560 A1 * | 8/2018 | Postic | .................... | G01V 1/247 |
| 2024/0246650 A1 * | 7/2024 | Clabburn | ................. | B63G 8/26 |

* cited by examiner

*Primary Examiner* — Anthony D Wiest
(74) *Attorney, Agent, or Firm* — Thibault Patent Group (57) ABSTRACT

Various embodiments of an apparatus and method for achieving and maintaining a desired depth of a submersible vessel are disclosed. The submersible vessel has both a ballast control system designed to alter a buoyancy of the submersible vessel and one or more vertical marine thrusters, designed to position the submersible vessel at a desired depth. Using the combination of the ballast control system and one or more thrusters, a desired depth may be achieved and maintained more quickly, more quietly and more accurately than vessels using only a ballast control system or one or more thrusters, respectively, alone.

20 Claims, 6 Drawing Sheets

FIG. 5B

APPARATUS AND METHOD FOR DEPTH CONTROL OF SUBMERSIBLE VESSELS

STATEMENT OF GOVERNMENT INTEREST

This invention was made with Government support under contract DE-SC0021905 awarded by the Department of Energy. The Government has certain rights in this invention.

BACKGROUND

Field of Use

The present application relates to the maritime industry. More specifically, the present application relates to methods and apparatus for maintaining a submerged depth of a marine vessel.

Description of the Related Art

Submersible vessels, such as submarines, remotely piloted marine vessels, and autonomous marine vessels, have been used for conducting a variety of tasks, such as underwater surveillance, marine biology studies, military uses, exploration, mapping, etc. Such tasks typically require a vessel to maintain one or more particular depths. Typically, submersible vessels adjust their depth using one of two techniques: by using ballast adjustment systems or by using vertical marine thrusters. A ballast adjustment system typically comprises one or more ballast tanks, one or more control valves located on the ballast tank(s), and a computer controller that causes the control valves to open and close. When the valves open, water floods the ballast tank(s), causing the buoyancy of a marine vessel to decrease, thereby causing the marine vessel to sink. When a desired depth is reached, the computer controller either injects compressed air into the ballast tank(s), pumps some of the water out of the ballast tank(s) using an electro-mechanical pump, or causes a cylinder to move inside the ballast tank(s), thereby ejecting water out through the control valve(s). In any case, some or all of the water inside the ballast tank(s) is/are displaced, thereby causing an increase of the buoyancy of the marine vessel. The computer controller tries to maintain a desired depth by displacing an amount of water in the ballast tank(s) to achieve neutral buoyancy.

Vertical marine thrusters have also been used to position submersible vessels to a particular depth and hold position at that depth. These thrusters typically utilize an electric motor under computer control that causes a propeller or impeller to turn, thereby creating a resultant force to act on a submersible vessel, causing it to ascend or descend in the water. When a particular depth is reached, the thruster(s) the computer controller may deactivate the thruster and attempt to maintain the desired depth. Unless the submersible vessel is inherently neutrally buoyant, the thruster(s) may need to be continuously active in order to maintain the desired depth.

Each of the above-described techniques for maintaining depth has certain disadvantages. Ballast control systems typically only able to obtain a coarse range of depth control, rather than a particular depth with any accuracy, and they typically consume relatively large amount of power when attempting to change buoyancy at depth. Thrusters may also use large amounts of energy when maneuvering a submersible vessel from the surface to a relatively deep depth. Thrusters may also be noisy, which may be undesirable in a number of applications.

It would be desirable, then, to provide a submersible vessel that can achieve and maintain desired depths at considerable accuracy without expending large amounts of energy.

SUMMARY

The embodiments described herein relate to a method and apparatus for achieving and maintaining a desired depth of a submersible vessel. In one environment, a submersible vessel is described, comprising a depth gauge for determining a depth of the submersible vessel, a ballast control system for altering a buoyancy of the submersible vessel, a vertical marine thruster for vertically positioning the submersible vessel by a thrust developed by the vertical marine thruster, a memory for storing processor-executable instructions, and a processor, coupled to the depth gauge, the ballast control system, the vertical marine thruster and the memory, for executing the processor-executable instructions that causes the processor to cause the ballast control system to change the buoyancy of the submersible vessel to a negative buoyancy, determine that the submersible vessel is within a predetermined distance of a desired depth, and in response to determining that the submersible vessel is within a predetermined distance of the desired depth, maintain the desired depth by activating the vertical marine thruster.

In another embodiment, a method for achieving and maintaining a desired depth of a submersible vessel described. In this embodiment, the method comprises causing the ballast control system to change the buoyancy of the submersible vessel to a negative buoyancy, determining that the submersible vessel is within a predetermined distance of a desired depth, and in response to determining that the submersible vessel is within a predetermined distance of the desired depth, maintaining the desired depth by activating the vertical marine thruster.

BRIEF DESCRIPTION OF THE DRAWINGS

The features, advantages, and objects of the embodiments of the present invention will become more apparent from the detailed description as set forth below, when taken in conjunction with the drawings in which like referenced characters identify correspondingly throughout, and wherein.

DETAILED DESCRIPTION

The present application describes various embodiments of a submersible marine vessel configured to descend underwater and accurately maintain one or more desired depths. This is achieved by configuring a submersible vessel with a ballast control system and one or more vertical marine thrusters. The use of both a ballast control system and one or more vertical marine thrusters enables a submersible vessel to quickly, quietly and accurately achieve and maintain one or more desired depths in lakes, rivers and oceans. In one embodiment, a submersible vessel is described as comprising one or more acoustic sensors or acoustic arrays, whereby the submersible vessel may descend to various depths, and accurately hold each depth for a time, listening at each depth to detect natural (marine life, seismic, etc.) and anthropogenic (illegal vishing vessels, shipping, surveys, etc.) anomalies.

A primary benefit of using both a ballast control system and one or more vertical marine thrusters is that using both reduces the power needed to achieve and maintain one or more desired depths. Generally, a ballast control system may be used to cause an initial dissent of a submersible vessel, where the energy needed to flood a buoyancy bladder is minimal (as opposed to changing buoyancy at depth, where pumping water from the bladder typically consumes much more power due to the increased pressure at depth). When the submersible vessel nears or reaches the desired depth, one or more thrusters can be used to maintain the submersible vessel at or near the desired depth, avoiding use of the ballast control system.

Figure 1:
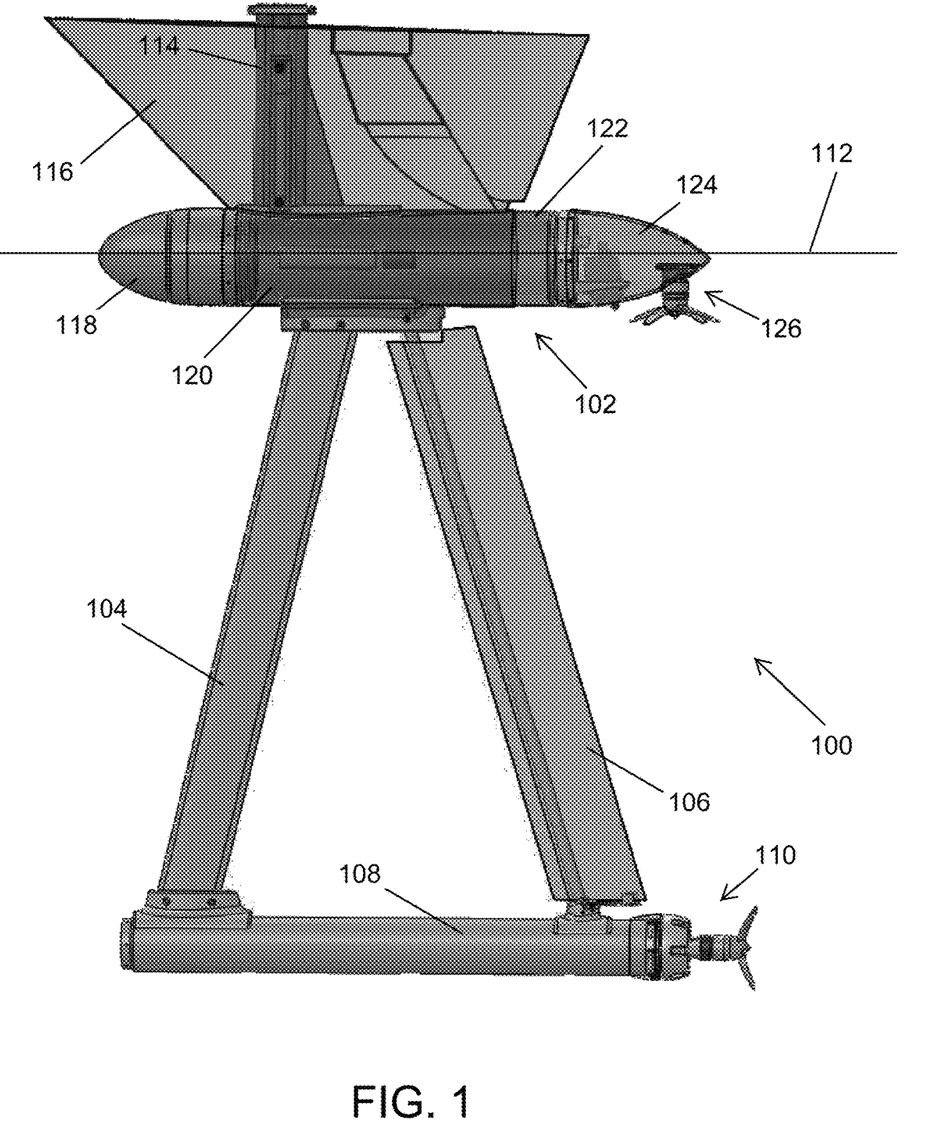
FIG. 1 is a side view of one embodiment of a submersible vessel resting on a water surface.

FIG. 1 is a side view of one embodiment of a submersible vessel 100 resting on a water surface 112, comprising hull assembly 102, underwater keel 104 coupled to an underside of hull assembly 102 and extending downward therefrom at an angle, a movable rudder 106 also coupled to an underside of hull assembly 102 and extending downward therefrom at an opposing angle from keel 104, a horizontal coupler 108 coupled to a distal end of keel 104 and movable rudder 106, and comprising forward propulsion unit 110, a portion of a mast 114 and a portion of a float 116. Hull assembly 102 comprises pressure tank 118 at a fore location, a payload section 120, a bladder 122 and an aft section 124 comprising vertical marine thruster 126.

Submersible vessel 100, in this embodiment, comprises an autonomous, submersible marine drone, capable of being propelled on water surface 112 by a sail (not shown) attached to float 116 or forward propulsion unit 110 and also capable of submerging underwater and being propelled by propulsion unit 110. Keel 104 acts to stabilize submersible vessel 100 and also to aid in steering submersible vessel 100 as wind acts on the sail. Movable rudder 106 allows for steering of submersible vessel 100 both while sailing on water surface 112 as well as while submersible vessel 100 is submerged underwater, propelled by forward propulsion unit 110. It should be understood that while one embodiment of the present invention is shown and described with respect to the particular submersible vessel shown in FIG. 1, the inventive concepts for achieving and maintaining a desired depth can equally be applied to either other configurations of the same vessel type, for example multi-hull vessels, various configurations of keel 104, rudder 106, forward propulsion unit 110, dual hull, tri-hull, etc., as well as to other types of submersible vessels, such as remotely operated vessels (ROVs) and human-occupied vessels, such as submarines.

Figure 2:
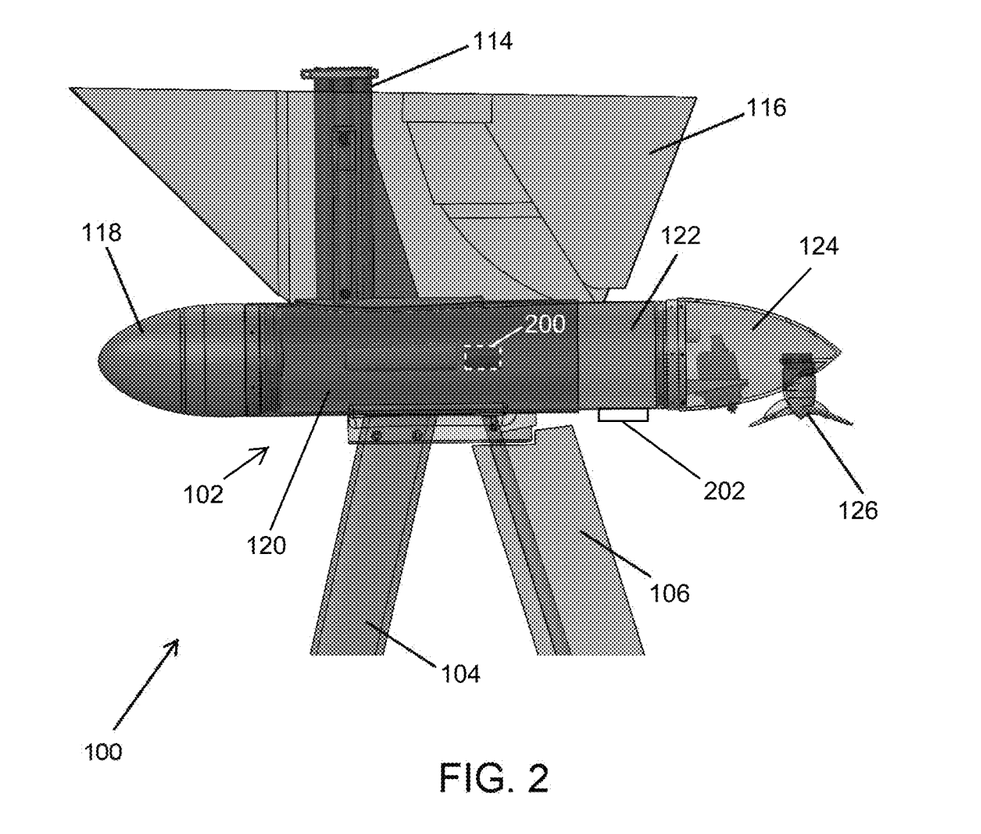
FIG. 2 is a side, close up view of a hull assembly as shown in FIG. 1.

FIG. 2 is a side, close up view of hull assembly 102 as shown in FIG. 1. Hull assembly 102 comprises pressure tank 118, payload section 120, bladder 122, and aft section 124. Pressure tank 118, bladder 122, processing unit 200 and control valve 202 comprise a ballast control system used to adjust a buoyancy of submersible vessel 100. In this embodiment, to make submersible vessel 100 less buoyant in order to scuttle submersible vessel 100, a processor of processing unit 200 causes control valve 202 to open, thereby allowing water to enter bladder 122 (in some embodiments, control valve 202 is not used and a simple orifice is formed where control valve 202 is shown). As water enters bladder 122, a volume of air is forced out of bladder 122, causing the buoyancy of submersible vessel 100 to be reduced to a point where submersible vessel is no longer able to float on water surface 112 and begins to sink. Conversely, when submersible vessel 100 is submerged underwater, processing unit 200 may cause submersible vessel 100 to rise to water surface 112 by causing control valve 202 to open (if it isn't already open) and causing compressed gas, typically ambient air, from pressure tank 118 to enter bladder 122. As the compressed gas enters bladder 122, it displaces the water inside bladder 122, causing the water to exit bladder 122 via control valve 202, thus increasing the buoyancy of submersible vessel 100 and causing submersible vessel 100 to ascend to water surface 112. Thus, buoyancy of submersible vessel 100 may be altered by the ballast control system to cause submersible vessel 100 to sink (negative buoyancy), ascend (positive buoyancy) and, in addition, achieve substantially neutral buoyancy, where submersible vessel 100 will neither sink nor ascend, in theory. In actuality, neutral buoyancy is difficult to maintain, as it is typically difficult to obtain the exact displacement inside bladder 122 to achieve absolute neutrality.

Vertical marine thruster 126 is used in conjunction with the ballast control system to achieve and maintain a desired depth of submersible vessel 100. Although only a single thruster 126 is shown in FIGS. 1 and 2, in other embodiments, two or more such thrusters may be used. Vertical marine thruster 126 comprises a propeller or impeller coupled to an electric motor, typically housed inside aft section 124. Vertical marine thrusters are known in the art, typically comprising a tube or some kind of ducting that channels water vertically, either up or down, causing a force that is exerted against submersible vessel 100. The force causes submersible vessel 100 to ascend or descend at a rate that is dependent on several factors, such as the buoyancy of submersible vessel 100, the size of the propeller or impeller and the rotational speed of the electric motor. In some embodiments, vertical marine thruster 126 and the ballast control system may achieve a desired depth of submersible vessel 100 by reducing the buoyancy of submersible vessel 100 via the ballast control system and then activating vertical marine thruster 126 at or near the desired depth. In this embodiment, vertical marine thruster 126 negates the negative buoyancy of submersible vessel 100 by causing an upward force to act on submersible vessel 100, thus maintaining the desired depth. In some embodiments, the negative buoyance of submersible vessel 100 may be reduced or a neutral buoyance achieved by the ballast control system when submersible vessel 100 is descending and at or near the desired depth. This generally requires less force to be created by vertical marine thruster 126 to maintain submersible vessel 100 at the desired depth.

Figure 3:
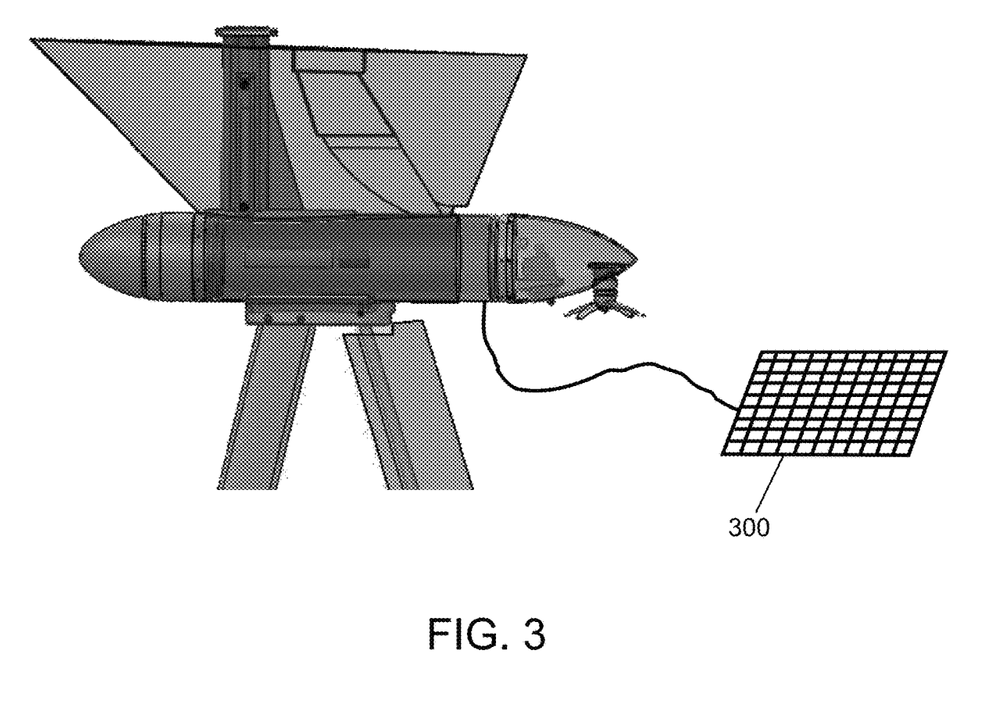
FIG. 3 is a close up, side view of the submersible vessel as shown in FIGS. 1 and 2, additionally comprising a plurality of acoustic sensors and an acoustic array.

FIG. 3 is a close up, side view of the submersible vessel 100 as shown in FIGS. 1 and 2, additionally comprising an acoustic array 300. In some embodiments, either a plurality of acoustic sensors mounted on or within submersible vessel 100, typically on or inside horizontal coupler 108 (not shown) or acoustic array 300 is used, but typically not both. The acoustic sensors/array are used to listen for various sounds while submersible vessel 100 is submerged under water. Such sensors are well-known in the art. Processing unit 200 may receive electronic signals from the acoustic sensors/array and process the signals to determine if one or more predetermined anomalies are present, such as the sound of a boat engine, a sound of a marine animal (such as a whale, a dolphin, etc.), the sound of submarine, etc. Water may comprise a number of different "channels", each channel comprising certain characteristics, such as a similar temperature, salinity, density, or some other characteristic. For example, an ocean may comprise 20 temperature channels, each channel measuring a temperature of 3 degrees Fahrenheit apart from a next channel in proximity to it. For example, from water surface 112 to a depth of three feet, representing a first channel, the temperature is 60 degrees. From a depth of three feet to a depth of seven feet, representing a second channel, the temperature is 58 degrees.

In one embodiment, when processing unit 200 determines that a predefined anomaly has occurred, based on signals received from the acoustic sensors/array, it causes submersible vessel 100 to ascend, sometimes as rapid as possible, in order to report the anomaly. Typically, processing unit 200 comprises a transmitter used to transmit a message to a remote location, such as a ship or land-based receiver, indicative of the anomaly.

Figure 4:
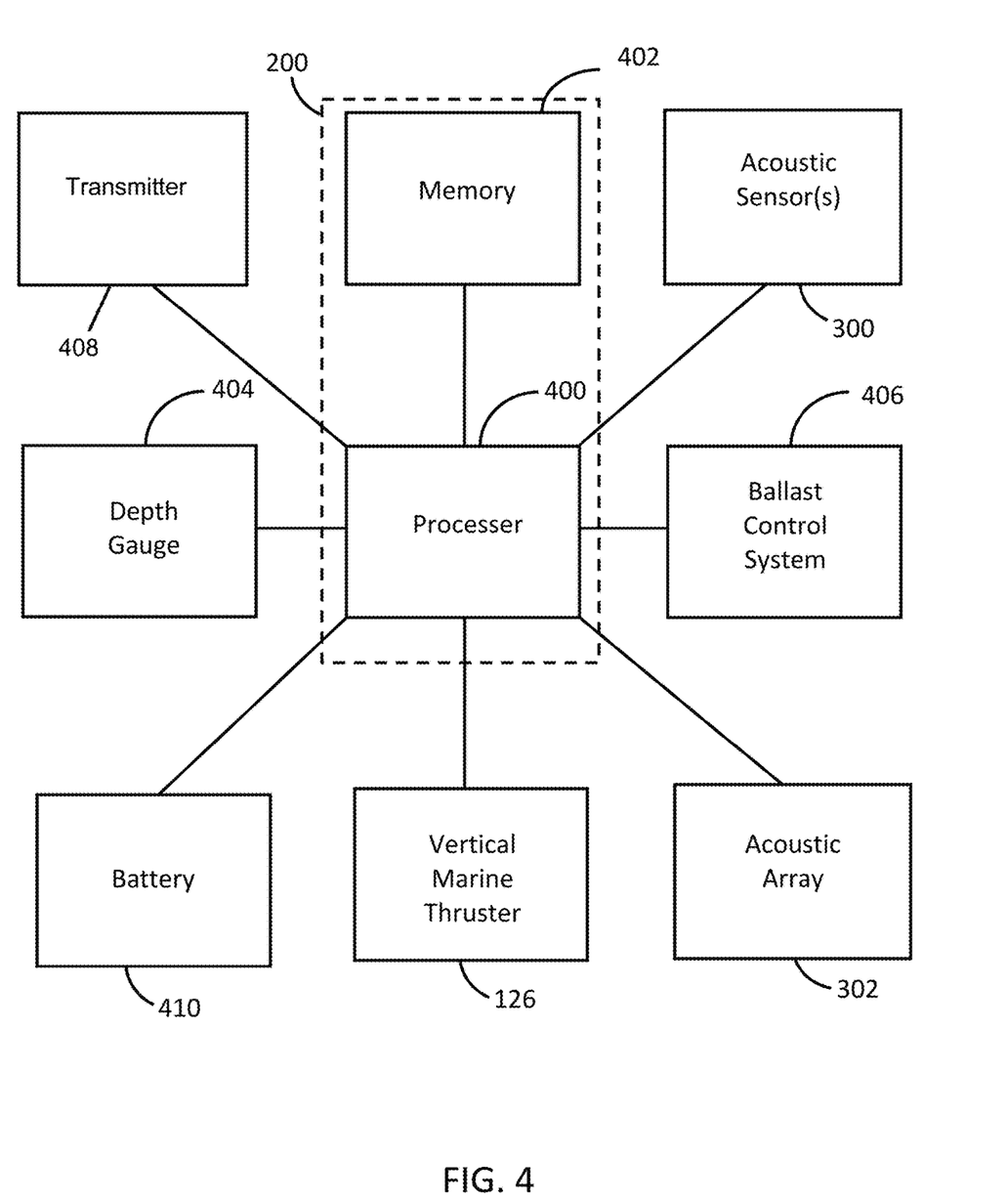
FIG. 4 is a functional block diagram of one embodiment of various components of submersible vessel.

FIG. 4 is a functional block diagram of one embodiment of various components of submersible vessel 100. Shown is processing unit 200 comprising processor 400 and memory 402, depth gauge 404, ballast control system 406, vertical marine thruster 126, acoustic sensor(s)/array 300, transmitter 408 and battery 410.

Processor 400 is configured to provide general operation of submersible vessel 100 by executing processor-executable instructions stored in memory 402, for example, executable computer code. Processor 400 typically comprises one or more general or specialized microprocessors, microcontrollers, and/or customized ASICs, selected based on computational speed, cost, power consumption, and other factors relevant to controlling a submersible vessel. In the case where processor 400 comprises a general-purpose processor, after processor 400 has been programmed with the processor-executable instructions, it becomes a specialized processor capable of performing one or more new and non-obvious functions as described later herein.

Memory 402 is coupled to processor 400 and comprises one or more non-transitory electronic, digital information storage devices, such as static and/or dynamic RAM, ROM, flash memory, or some other type of electronic, optical, or mechanical memory device. Memory 402 is used to store processor-executable instructions for operation submersible vessel 100. It should be understood that in some embodiments, a portion of memory 402 may be embedded into processor 400 and, further, that memory 402 excludes propagating signals. Memory 402 may additionally store information relevant to the functionality of submersible vessel 100, such as one or more predetermined depths, one or more times that submersible vessel 100 should remain at each depth, navigation coordinates, etc.

Depth gauge 404 is coupled to processor 400 and is used to indicate a depth of submersible vessel 100. Depth gauges are well-known in the art, typically comprising a pressure sensor that provides readings indicative of a sensed pressure, which can thereby be translated into a depth.

Ballast control system 406 is coupled to processor 400 and used to adjust a buoyancy of submersible vessel 100. In one embodiment, ballast control system 406 comprises pressure tank 118, bladder 122 and control valve 202. In another embodiment, pressure tank 118 is not used, replaced by an electromechanical pump that at least pumps water out of bladder 122 in order to increase the buoyancy of submersible vessel 100. In another embodiment, control valve 202 is not used, replaced by a simply hole or orifice formed in an underside of bladder 122, which allows water to enter and exit bladder 122 under the control of processor 400 and pressure tank 118 or an electro-mechanical pump. In any case, when processor 400 determines to submerge submersible vessel 100, it causes ballast control system to open in order to allow water to enter bladder 122, typically by causing control valve 202 to open, thereby displacing air therein and decreasing the buoyancy of submersible vessel 100 until it begins to sink. Conversely, when processor 400 determines that it is time to raise submersible vessel 100 to a higher depth, or to water surface 112, processor 400 causes control valve 202 to open (if it had been closed after submerging submersible vessel 100) and force water inside bladder 122 out through control valve 202 using either pressurized gas from pressure tank 118 or by pumping the water out of bladder 122 using an electro-mechanical pump.

Transmitter 408 is coupled to processor 400, used to transmit wireless signals from submersible vessel 100 to a remote location, such as another vessel or to a land-based receiver. Transmitter 408 may comprise well-known hardware and software protocols in order to transmit signals wirelessly over large distances.

Battery 410 provides power to the various components of submersible vessel 100. Battery 410 typically comprises a rechargeable marine battery capable of supplying, for example, 12 V of DC power at a particular amperage, such as at 50 Amps. Processor 400 may monitor a remaining battery life of battery 410 in order to determine which, or both, of ballast control system 406 and/or vertical marine thruster 126 to use in order to achieve and maintain a desired depth.

Figure 5A:
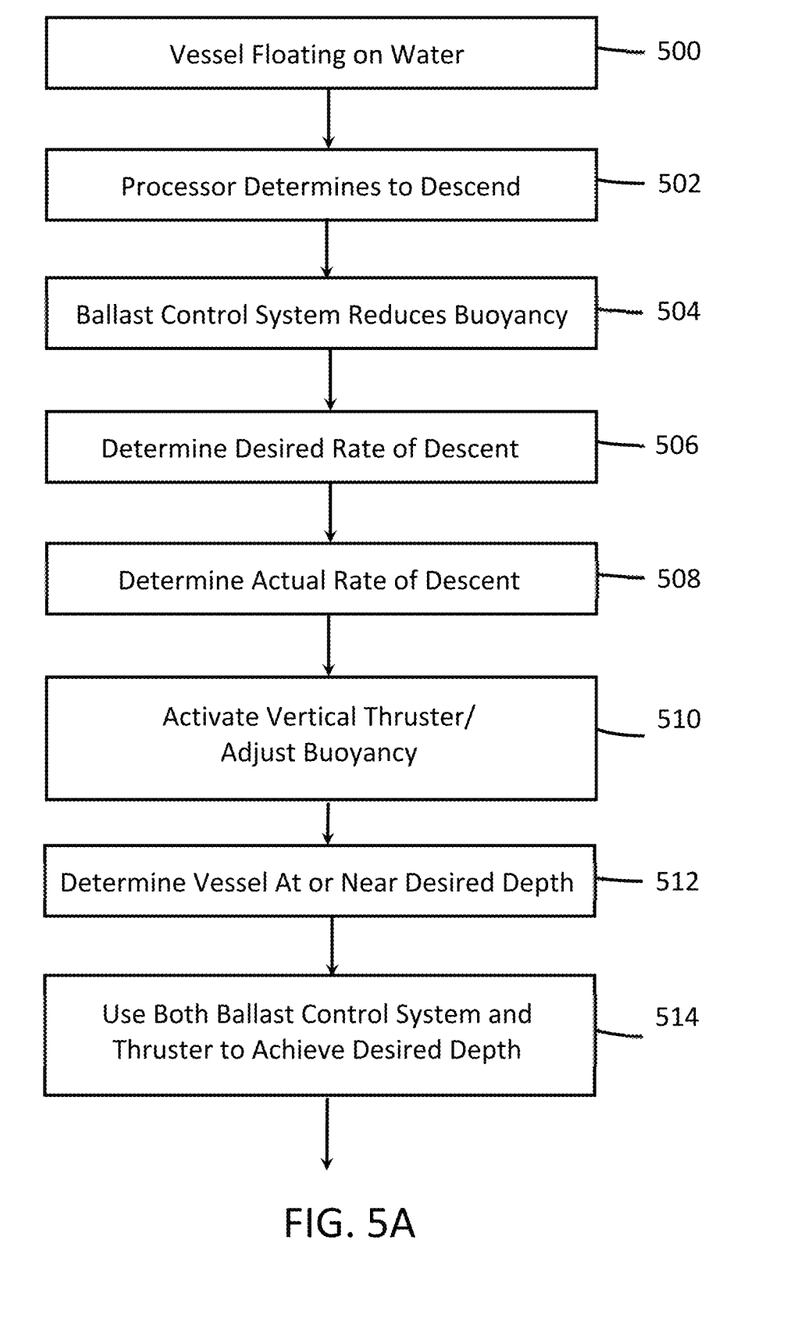
FIGS. 5A and 5B represent a flow chart describing one embodiment of a method for achieving and maintaining a desired depth of the submersible vessel as shown in FIGS. 1-3.
Figure 5B:
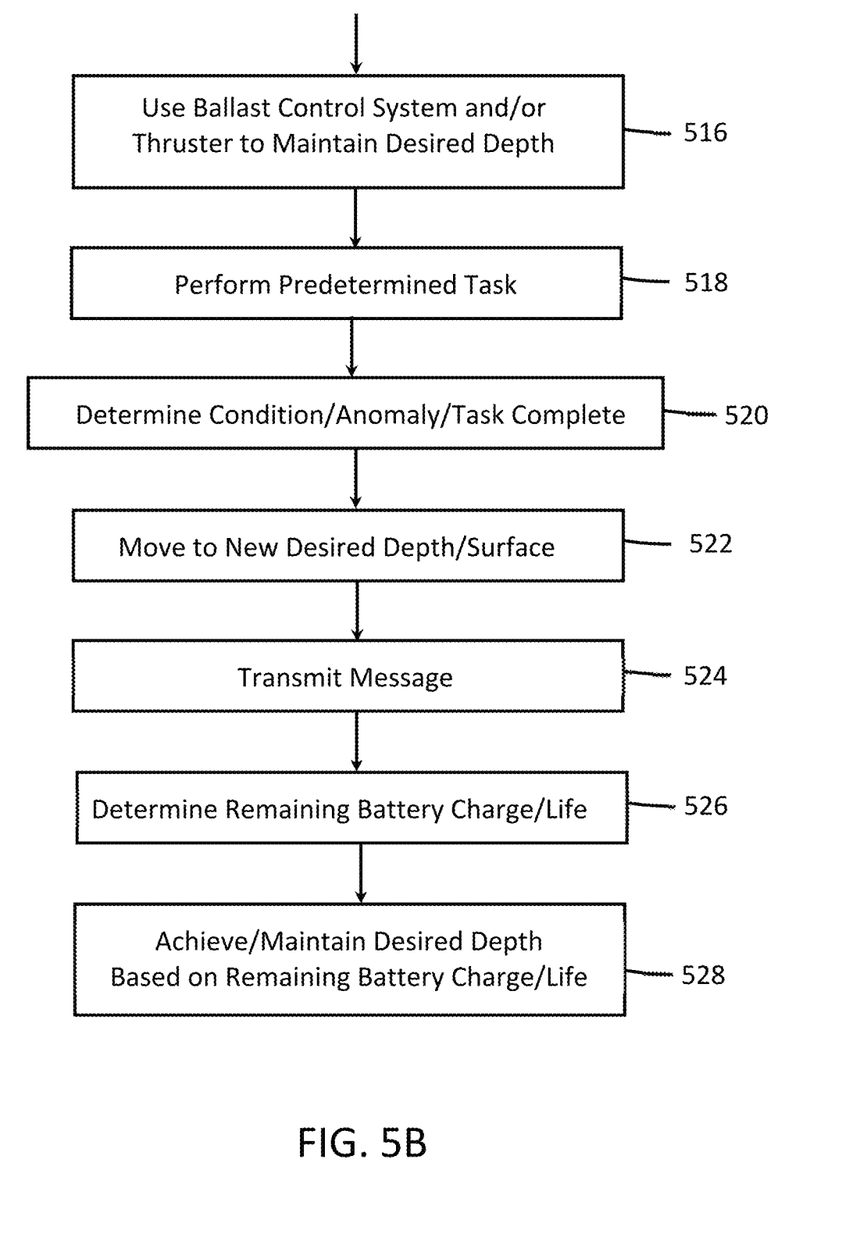

FIGS. 5A and 5B represent a flow chart describing one embodiment of a method, performed by processor 400, for achieving and maintaining a desired depth of submersible vessel 100. It should be understood that the steps listed in FIG. 5 may be performed in a different order than shown and described, and that minor method steps may have been omitted, as these minor method steps are well-known in the art.

At block 500, submersible vessel 100 is positively buoyant, floating on water surface 112. Bladder 122 is full or at least partially full of air or other gas provided by pressure tank 118, or ambient air, and control valve 202 may be closed. Submersible vessel 100 may have been previously placed or positioned in a desired location of an ocean, sea, lake or other body of water in order to carry out one or more tasks or missions, such as to observe and record shipping activity in the area, including submarine activity, to observe and record underwater marine life, to take scientific measurements related to the water in which submersible vessel 100 is located, such as the water temperature, salinity, density, current speed, etc. As part of one or more of the foregoing, submersible vessel 100 may comprise one or more acoustic sensors/arrays 300 for listening for sounds that traverse through the water.

At block 502, processor 400 determines that submersible vessel 100 should submerge underneath water surface 112 to a desired depth. Processor 400 may determine that submersible vessel 100 should submerge to the desired depth either autonomously, for example, as a result of processor 400 determining that a predetermined condition has occurred, such as rough seas, high wind, an approaching vessel, or simply a date and time of day. In other embodiments, processor 400 may receive instructions wirelessly from a remote location, such as another vessel or a land-based location, instructing submersible vessel 100 to submerge to the desired depth. The desired depth may be pre-programmed into memory 402, or it may be received wirelessly from the remote location.

At block 504, processor 400 causes ballast control system 406 to reduce the buoyancy of submersible vessel 100 in order to cause submersible vessel 100 to submerge beneath water surface 112. In one embodiment, processor 400 causes control valve 202 to open, thereby allowing water to enter bladder 122. In another embodiment, processor 400 causes an electro-mechanical pump to pump water into bladder 122. As submersible vessel 100 begins to descend, water may continue to enter bladder 122, thus causing the buoyancy of submersible vessel 102 continue to decrease. At some point, processor 400 may cause the buoyancy to stop decreasing by, for example, closing control valve 202.

At block 506, in one embodiment, processor 400 determines a desired rate of descent by retrieving the desired rate of descent from memory 402.

At block 508, processor 400 may determine an actual rate of descent of submersible vessel 100 via signals received from depth gauge 404, and compare the actual rate of descent to the desired rate of descent as stored in memory 402.

At block 510, if the actual rate of descent is less than the desired rate of descent, and ballast control system 406 has achieved maximum negative buoyancy, i.e., bladder 122 is full of water, processor 400 may activate vertical thruster 126 to apply a downward force to submersible vessel 100 that causes submersible vessel 100 to increase the actual rate of descent. Using both ballast control system 406 and vertical marine thruster 126 together may cause submersible vessel 100 to descend at a rate that is faster than either ballast control system 406 or vertical marine thruster 126 may achieve alone.

If the rate of descent is greater than the desired rate of descent, processor 400 may cause ballast control system 406 to increase the buoyancy of submersible vessel 100, while maintaining a negative buoyancy, until the desired rate of descent has been achieved. In one embodiment, processor 400 causes ballast control system 406 to close control valve 202. In another embodiment, processor 400 causes an electro-mechanical pump to stop pumping water out of bladder 122. In one embodiment, processor 400 causes ballast control system 406 to maintain the buoyancy of submersible vessel 100 when processor 400 determines that the rate of descent of submersible vessel 100 has reached a predetermined rate of descent. In another embodiment, processor 400 may deactivate vertical marine thruster 126 if it was previously activated in order to achieve a desired rate of descent.

At block 512, processor 400 may determine that submersible vessel 100 is within a predetermined depth of the desired depth via signals received from depth gauge 404. For example, the predetermined depth may be stored in memory 402 as a depth within 5 feet, above or below, the desired depth.

At block 514, in response to determining that submersible vessel 100 is within the predetermined depth of the desired depth, processor 400 may use both ballast control system 406 and vertical marine thruster 126 to achieve and maintain the desired depth.

In one embodiment, when submersible vessel 100 is within the predetermined depth of the desired depth, processor 400 activates vertical marine thruster 126 to apply an upward force against submersible vessel 100 in order to counteract the downward force caused by the negative buoyancy of submersible vessel 100 and achieve the desired depth. In this embodiment, processor 400 causes vertical marine thruster 126 to achieve an upward force that is equal to the downward force caused by the negative buoyancy, such that submersible vessel maintains the desired depth. In one embodiment, submersible vessel 100 may continue to descend for a short time after activation of the vertical marine thruster 126, due to the momentum of submersible vessel 100 descending through the water. In this case, processor 400 may cause vertical marine thruster 126 to apply a counteracting force against submersible vessel 100 greater than the downward force caused by the negative buoyancy. Processor 400 may then cause vertical marine thruster 126 to decrease the upward force against submersible vessel 100 as submersible vessel 100 slows its downward descent and achieves the desired depth. Processor 400 may cause vertical marine thruster 126 to linearly decrease the upward force against submersible vessel 100 until submersible vessel 100 achieves the desired depth and, at that point, processor 400 may cause vertical marine thruster 126 to maintain a fixed upward force against submersible vessel 100 in order to maintain submersible vessel 100 at the desired depth. This assumes that submersible vessel 100 maintains a negative buoyancy as vertical marine thruster 126 exerts an upward force against submersible vessel 100.

In another embodiment, when submersible vessel 100 is within the predetermined depth of the desired depth, processor 400 may cause ballast control system 406 to adjust the buoyancy of submersible vessel 100 so that the buoyancy becomes substantially neutral in order to achieve the desired depth. In one embodiment, processor 400 causes ballast control system 406 to adjust the buoyancy before submersible vessel 100 reaches the desired depth such that submersible vessel 100 achieves the desired depth at substantially the same time that submersible vessel 100 achieves substantially neutral buoyancy. In one embodiment, processor 400 causes ballast control system 406 to increase the buoyancy at a predetermined, linear rate in order to achieve substantially neutral buoyancy as submersible vessel achieves the desired depth. When submersible vessel 100 is at the desired depth at neutral buoyancy, it may not be necessary to use vertical marine thruster 126 to trim the depth of submersible vessel 100.

In yet another embodiment, when submersible vessel 100 is within the predetermined depth of the desired depth, processor 400 may cause ballast control system 406 to begin increasing the buoyance of the submersible vessel at a predetermined rate to reach a substantially neutral buoyancy when the submersible vessel reaches the predetermined depth.

At block 516, processor 400 maintains the desired depth using one or both of ballast control system 406 and/or vertical marine thruster 126.

In one embodiment, processor 400 may cause submersible vessel 100 to maintain the desired depth simply by causing ballast control system 406 to achieve a substantially neutral buoyancy, and to deactivate vertical marine thruster 126 if vertical marine thruster 126 had been previously activated in order to achieve a desired rate of descent.

In another embodiment, processor 400 may cause ballast control system 406 to achieve substantially neutral buoyancy, deactivate vertical marine thruster 126 if it had been previously activated, and monitor the depth of submersible vessel 100 using signals received from depth gauge 404. If submersible vessel 100 descends a predetermined depth from the desired depth, processor 400 may cause vertical marine thruster 126 to activate, applying an upward force against submersible vessel 100 in order to bring submersible vessel 100 back to the desired depth. Once submersible vessel 100 reaches the desired depth, or at a point just before submersible vessel 100 reaches the desired depth, processor 400 may deactivate vertical marine thruster 126. In one embodiment, processor 400 causes vertical marine thruster 126 to ramp down the upward force, such as linearly, in order to slow the assent of submersible vessel 100 as it nears the desired depth. The force applied to submersible vessel 100 by vertical marine thruster 126 is typically related to a speed at which its propeller, impeller, or the like, spins. Thus, processor 400 may reduce the upward force caused by vertical marine thruster 126 by instructing vertical marine thruster 126 to slow the rate at which its propeller spins from a first rate that causes a relatively large upward force against submersible vessel 102 to a reduced rate of spin, or to completely stop rotation of the propeller, when submersible vessel 100 is near or reaches the desired depth.

Similarly, if submersible vessel 100 rises to a predetermined depth from the desired depth, processor 400 may cause vertical marine thruster 126 to activate, applying a downward force against submersible vessel 100 in order to bring submersible vessel 100 back to the desired depth. Similar techniques can be used to accurately maintain the desired depth, as explained above with respect to submersible vessel 100 descending to a predetermined depth from the desired depth.

In yet another embodiment, in order to maintain the desired depth, processor 400 causes ballast control system 406 to change the buoyancy of submersible vessel 102 to a positive buoyancy and then activates vertical marine thruster 126 to apply a downward force against submersible vessel 100 when submersible vessel 100 ascends to a predetermined depth above the desired depth. For example, if the predetermined depth is 100 feet, submersible vessel may rise to a depth of 95 feet, or 5 feet above the desired depth and, in response, processor 400 may activate vertical marine thruster 126 to apply a downward force against submersible vessel 100 in order to bring submersible vessel 100 back down to the predetermined depth. Once submersible vessel 100 has returned to the desired depth, or a depth a predetermined distance down from the desired depth, processor 400 may deactivate vertical marine thruster 126 or too slow the rate at which the propeller spins, thus reducing the downward force applied by vertical marine thruster 126 against submersible vessel 100. In this embodiment, if a failure occurs with vertical marine thruster 126, submersible vessel 100 will always rise to the surface for repairs since, in this embodiment, processor 400 causes ballast control system 406 to maintain a positive buoyancy.

In a similar embodiment, in order to maintain the desired depth, processor 400 causes ballast control system 406 to change the buoyancy of submersible vessel 102 to a negative buoyancy and then activates vertical marine thruster 126 to apply an upward force against submersible vessel 100 when submersible vessel 100 descends to a predetermined depth below the desired depth. Once submersible vessel 100 has returned to the desired depth, or a depth a predetermined depth above the desired depth, processor 400 may deactivate vertical marine thruster 126 or slow the rate at which the propeller spins, thus reducing the upward force applied by vertical marine thruster 126 against submersible vessel 100.

In yet another embodiment, in order to maintain the desired depth, processor 400 may cause ballast control system 400 to change the buoyancy of submersible vessel 100 while additionally activating vertical marine thruster 126. In this embodiment, vertical marine thruster 126 may have difficulty maintaining the desired depth, for example, in rough water or strong currents. When processor 400 determines that it cannot maintain the desired depth using vertical marine thruster 126 alone, it may cause ballast control system 406 to adjust the buoyancy of submersible vessel 100. For example, processor 400 may attempt to maintain a desired depth of 100 feet, with a predetermined range of 3 feet above and below the desired depth at which time processor 400 activates vertical thruster 126. If, after activating vertical thruster 126, processor cannot maintain submersible vessel 100 between a depth of between 97 feet and 103 feet, processor 400 may cause ballast control system 406 to increase or decrease the buoyancy of submersible vessel 100 by a predetermined amount in order to achieve the desired range of depth. For example, if submersible vessel 100 descends below 97 feet, and vertical marine thruster 126 cannot apply enough force against submersible vessel 100 in order to bring submersible vessel 100 back to the desired depth, then processor 100 may cause ballast control system 406 to increase the buoyancy of submersible vessel 100 by a predetermined amount relative to its current buoyancy, such as an increase of 2%. This increase may allow vertical marine thruster 126 to control the depth of submersible vessel 100 in between the range of depths. Similarly, if submersible vessel 100 rises to a depth less than 103 feet, processor 400 may cause ballast control system 406 to decrease the buoyancy of submersible vessel 100. Processor 400 may learn over time that the predetermined amount of buoyancy change is not enough to allow vertical marine thruster 126 to maintain the depth of submersible vessel 100. In this case, processor 400 may increase the predetermined buoyancy amount, for example from a 2% change to a 3% change.

At block 518, processor 400 may begin to perform a predetermined task assigned to submersible vessel 100. For example, processor 400 may receive signals from acoustic sensors/array 300 as underwater sounds are received by the sensors/array and process the signals.

At block 520, processor 400 may determine that the signals from the sensors/array indicate an adverse condition, an acoustic anomaly or that the predetermined task has been completed. For example, processor 400 may determine that a vessel is very close to submersible vessel 100, based on an amplitude of engine noise detected by the sensors/array, and that the engine noise is increasing over time. In another embodiment, processor 400 may achieve an objective of the predetermined task, such as to record five minutes of underwater sounds at a particular depth, or to determine a salinity of water surrounding submersible vessel 100 at the desired depth.

At block 522, in response to determining that an adverse condition, acoustic anomaly or that the predetermined task has been completed, processor 400 may cause submersible vessel 102 to ascend or descend to a second predetermined depth, in accordance with one or more of the techniques discussed above. In one embodiment, when processor 400 determines that an adverse condition, acoustic anomaly or that the predetermined task has been completed, processor 400 may cause submersible vessel 102 rise to water surface 112. In one embodiment, processor 400 causes submersible vessel 102 to rise at the fastest rate of ascent possible by causing ballast control system 406 to increase the buoyancy of submersible vessel 100 to a maximum buoyancy, and to simultaneously activate vertical marine thruster 126 in order to apply a maximum upward force against submersible vessel 100.

At block 524, processor 400 may generate a message and transmit the message via transmitter to a remote location such as another vessel or a land-based receiver. The message may comprise information relating to the anomaly or condition, including, in one embodiment, an audio recording of underwater sounds stored in memory 402.

At block 526, processor 400 may determine a remaining battery life or charge of battery 410, using techniques well-known in the art.

At block 528, processor 400 may control the depth of submersible vessel 100 differently depending on the remaining battery life or charge. For example, if processor 400 determines that the remaining battery charge of battery 410 is low, for example 3 hours of charge remaining, processor 400 may prioritize use of vertical marine thruster 126 over ballast control system 406 when ballast control system 406 uses more energy to help achieve or maintain a desired depth. In one embodiment, prioritization of vertical marine thruster 126 may comprise increasing the range of acceptable depths around the desired depth so that vertical marine thruster 126 is used to maintain the range of the desired depth, as opposed to changing the buoyancy via ballast control system 406 when submersible vessel 100 exceeds the original range. Conversely, when processor 400 determines that the remaining battery life or charge of battery 410 exceeds a predetermined level indicative of a long remaining battery life or charge, processor 400 may prioritize ballast control system 406 over vertical marine thruster 126 to achieve and maintain a desired depth.

While the foregoing disclosure shows illustrative embodiments of the invention, it should be noted that various changes and modifications could be made herein without departing from the scope of the embodiments as defined by the appended claims. Furthermore, although elements of the invention may be described or claimed in the singular, the plural is contemplated unless limitation to the singular is explicitly stated.

I claim:

1. A submersible vessel, configured to achieve and maintain a desired depth, comprising:
a depth gauge for determining a depth of the submersible vessel;
a ballast control system for altering a buoyancy of the submersible vessel;
a vertical marine thruster for vertically positioning the submersible vessel by a thrust developed by the vertical marine thruster;
a memory for storing processor-executable instructions; and
a processor, coupled to the depth gauge, the ballast control system, the vertical marine thruster and the memory, for executing the processor-executable instructions that causes the processor to:
cause the ballast control system to change the buoyancy of the submersible vessel to a negative buoyancy;
determine that the submersible vessel is within a predetermined distance of a desired depth; and
in response to determining that the submersible vessel is within a predetermined distance of the desired depth, maintain the desired depth by activating the vertical marine thruster.

2. The submersible vessel of claim 1, wherein the processor-executable instructions comprise further instructions that causes the processor to:
in response to determining that the submersible vessel is within the predetermined distance from the desired depth, cause the ballast control system to change the buoyancy of the submersible vessel to a neutral buoyancy.

3. The submersible vessel of claim 2, wherein the processor-executable instructions comprise further instructions that causes the processor to:
in response to the submersible vessel reaching the desired depth, deactivate the vertical marine thruster.

4. The submersible vessel of claim 1, wherein the processor-executable instructions comprise further instructions that causes the processor to:
determine that a predetermined event has occurred; and
in response to determining that the predetermined event has occurred, cause the vertical marine thruster to move the submersible vessel to a water surface.

5. The submersible vessel of claim 1, wherein the processor-executable instructions that cause the processor to maintain the submersible vessel at the desired depth comprise instructions that causes the processor to:
cause the vertical marine thruster to exert an upward thrust against the submersible vessel when the depth of the submersible vessel sinks to a first predetermined depth below the desired depth; and
cause the vertical marine thruster to exert a downward thrust against the submersible vessel when the depth of the submersible vessel rises to a second predetermined depth above the desired depth.

6. The submersible vessel of claim 1, wherein the processor-executable instructions that cause the processor to maintain the submersible vessel at the desired depth comprise instructions that causes the processor to:
cause the ballast control system to change the buoyancy of the submersible vessel to a positive buoyancy;
determine that the submersible vessel has ascended to a predetermined distance from the desired depth; and
activate the thruster to exert a downward thrust against the submersible vessel until the submersible vessel has reached the desired depth.

7. The submersible vessel of claim 1, wherein the processor-executable instructions that cause the processor to maintain the submersible vessel at the desired depth comprise instructions that causes the processor to:
prior to activation of the vertical marine thruster, determine a rate of descent of the submersible vessel; and
in response to determining that the submersible vessel is within the predetermined distance of the desired depth, cause the ballast control system to begin increasing the buoyancy of the submersible vessel at a predetermined rate to reach a substantially neutral buoyancy when the submersible vessel reaches the predetermined depth.

8. The submersible vessel of claim 1, further comprising:
an underwater acoustic sensor coupled to the processor; and
a transmitter coupled to the processor;
wherein the processor-executable instructions further comprise instructions that causes the processor to:
determine that an acoustic anomaly has occurred from signals from the acoustic sensor;
in response to determining the acoustic anomaly, cause the ballast control system to increase the buoyance of the submersible vessel;
in response to determining the acoustic anomaly, cause the vertical marine thruster to move the submersible vessel to the water surface;
determine when the submersible vessel has surfaced; and
transmit a message to a remote location indicating that the acoustic anomaly has occurred.

9. The submersible vessel of claim 1, wherein the processor-executable instructions that cause the processor to maintain the submersible vessel at the desired depth comprise instructions that causes the processor to:

in addition to activating the vertical marine thruster, cause the ballast control system to increase the buoyancy of the submersible vessel by a first predetermined amount when the submersible vessel sinks to a first predetermined depth below the desired depth, and cause the ballast control system to decrease the buoyancy of the submersible vessel by a second predetermined amount when the submersible vessel rises to a second predetermined depth above the desired depth.

10. The submersible vessel of claim 1, wherein the processor-executable instructions further comprise instructions that causes the processor to:

after maintaining the desired depth, cause the ballast control system to change the buoyance of the submersible vessel;

simultaneously activate the vertical marine thruster;

wherein simultaneously casing the ballast control system to change the buoyancy of the submersible vessel and activating the vertical marine thruster achieves a rate of descent or ascent of the submersible vessel that exceeds a rate of descent or ascent, respectively, able to be achieved by the ballast control system or the vertical marine thruster, respectively, alone.

11. A method for maintaining a desired depth of a submersible vessel, the submersible vessel comprising a ballast control system and a vertical marine thruster, the method comprising:

causing the ballast control system to change the buoyancy of the submersible vessel to a negative buoyancy;

determining that the submersible vessel is within a predetermined distance of a desired depth; and in response to determining that the submersible vessel is within a predetermined distance of the desired depth, maintaining the desired depth by activating the vertical marine thruster.

12. The method of claim 11, further comprising:

in response to determining that the submersible vessel is within the predetermined distance from the desired depth, causing the ballast control system to change the buoyancy of the submersible vessel to a neutral buoyancy.

13. The method of claim 12, further comprising:

in response to the submersible vessel reaching the desired depth, deactivating the vertical marine thruster.

14. The method of claim 11, further comprising:

determining that a predetermined event has occurred; and in response to determining that the predetermined event has occurred, causing the vertical marine thruster to move the submersible vessel to a water surface.

15. The method of claim 11, wherein maintaining the submersible vessel at the desired depth comprises:

causing the vertical marine thruster to exert an upward thrust against the submersible vessel when the depth of the submersible vessel sinks to a first predetermined depth below the desired depth; and causing the vertical marine thruster to exert a downward thrust against the submersible vessel when the depth of the submersible vessel rises to a second predetermined depth above the desired depth.

16. The method of claim 11, wherein maintaining the submersible vessel at the desired depth comprises:

causing the ballast control system to change the buoyancy of the submersible vessel to a positive buoyancy;

determining that the submersible vessel has ascended to a predetermined distance from the desired depth; and activating the thruster to exert a downward thrust against the submersible vessel until the submersible vessel has reached the desired depth.

17. The method of claim 11, wherein maintaining the submersible vessel at the desired depth comprises:

prior to activation of the vertical marine thruster, determining a rate of descent of the submersible vessel; and in response to determining that the submersible vessel is within the predetermined distance of the desired depth, causing the ballast control system to begin increasing the buoyance of the submersible vessel at a predetermined rate to reach a substantially neutral buoyancy when the submersible vessel reaches the predetermined depth.

18. The method of claim 11, further comprising:

determining that an acoustic anomaly has occurred from signals from an acoustic sensor coupled to the submersible vessel;

in response to determining the acoustic anomaly, causing the ballast control system to increase the buoyance of the submersible vessel;

determining when the submersible vessel has surfaced; and transmitting a message to a remote location indicating that the acoustic anomaly has occurred.

19. The method of claim 11, wherein maintaining the submersible vessel at the desired depth comprises:

in addition to activating the vertical marine thruster, causing the ballast control system to increase the buoyancy of the submersible vessel by a first predetermined amount when the depth of the submersible vessel sinks to a first predetermined depth below the desired depth, and causing the ballast control system to decrease the buoyancy of the submersible vessel by a second predetermined amount when the submersible vessel rises to a second predetermined depth above the desired depth.

20. The method of claim 11, further comprising:

after maintaining the desired depth, causing the ballast control system to change the buoyance of the submersible vessel; and simultaneously activating the vertical marine thruster;

wherein simultaneously casing the ballast control system to change the buoyancy of the submersible vessel and activating the vertical marine thruster achieves a rate of descent or ascent of the submersible vessel that exceeds a rate of descent or ascent, respectively, achievable by the ballast control system or the vertical marine thruster, respectively, alone.

* * * * *